US012595135B1

(12) United States Patent
Rochelle et al.

(10) Patent No.: US 12,595,135 B1
(45) Date of Patent: Apr. 7, 2026

(54) PREDICTIVE MATERIAL HANDLING EQUIPMENT JAM PREVENTION

(71) Applicant: Amazon Technologies, Inc., Seattle, WA (US)

(72) Inventors: Jesse Edward Rochelle, Federal Way, WA (US); Farouq Halawa, Seattle, WA (US); Raashid Mohammed, Lynnwood, WA (US); Chelsea Marie Beroske, Littleton, CO (US); Terrick Willoughby, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 584 days.

(21) Appl. No.: 18/079,320

(22) Filed: Dec. 12, 2022

(51) Int. Cl.
| | |
|---|---|
| *B65G 43/08* | (2006.01) |
| *B65G 47/24* | (2006.01) |
| *G06Q 10/087* | (2023.01) |
| *G06T 7/00* | (2017.01) |
| *G06T 7/70* | (2017.01) |
| *G06V 10/764* | (2022.01) |
| *G06V 10/774* | (2022.01) |

(52) U.S. Cl.
CPC ............ *B65G 43/08* (2013.01); *B65G 47/24* (2013.01); *G06Q 10/087* (2013.01); *G06T 7/0004* (2013.01); *G06T 7/70* (2017.01); *G06V 10/764* (2022.01); *G06V 10/774* (2022.01); *B65G 2203/0233* (2013.01); *B65G 2203/041* (2013.01); *G06T 2207/10016* (2013.01); *G06T 2207/20081* (2013.01)

(58) Field of Classification Search
CPC B65G 43/08; B65G 47/24; B65G 2203/0233; B65G 2203/041; G06Q 10/087; G06T 7/0004; G06T 7/70; G06T 2207/10016; G06T 2207/20081; G06V 10/764; G06V 10/774
See application file for complete search history.

(56) References Cited

U.S. PATENT DOCUMENTS

| | | | | |
|---|---|---|---|---|
| 4,754,867 | A * | 7/1988 | De Anda ............ | H05K 13/0061 198/572 |
| 2014/0247347 | A1 * | 9/2014 | McNeill ............... | G06V 10/764 382/103 |

(Continued)

*Primary Examiner* — Jacob S. Scott
*Assistant Examiner* — Miraj T. Patel
(74) *Attorney, Agent, or Firm* — Kilpatrick Townsend & Stockton LLP

(57) ABSTRACT

Techniques for predicting and preventing jams in material handling equipment are described. In an example, a device includes a camera that can generate a video including image frames showing a material handling equipment. The device also includes a computer system that can generate an input including the image frames to a machine learning model. The computer system can determine an output of the machine learning model based on the input that includes a prediction that a jam in the material handling equipment is to occur within a next time interval and a classification of the jam. The jam can involve an object being handled by the material handling equipment. The computer system can determine a jam prevention action to perform based on the classification. The computer system can cause the jam prevention action to be performed within the next time interval in association with the object to prevent the jam.

20 Claims, 13 Drawing Sheets

(56) References Cited

U.S. PATENT DOCUMENTS

| | | | |
|---|---|---|---|
| 2021/0118154 A1* | 4/2021 | Oberpriller | G06T 7/285 |
| 2025/0001614 A1* | 1/2025 | Cristache | B25J 9/1697 |
| 2025/0083905 A1* | 3/2025 | Karpov | B65G 13/10 |

* cited by examiner

600

900

Tote 0.43

902

904

Tote 0.41   Tote 0.42

Tote 0.38

Tote 0.40

Tote 0.39

Figure 10:
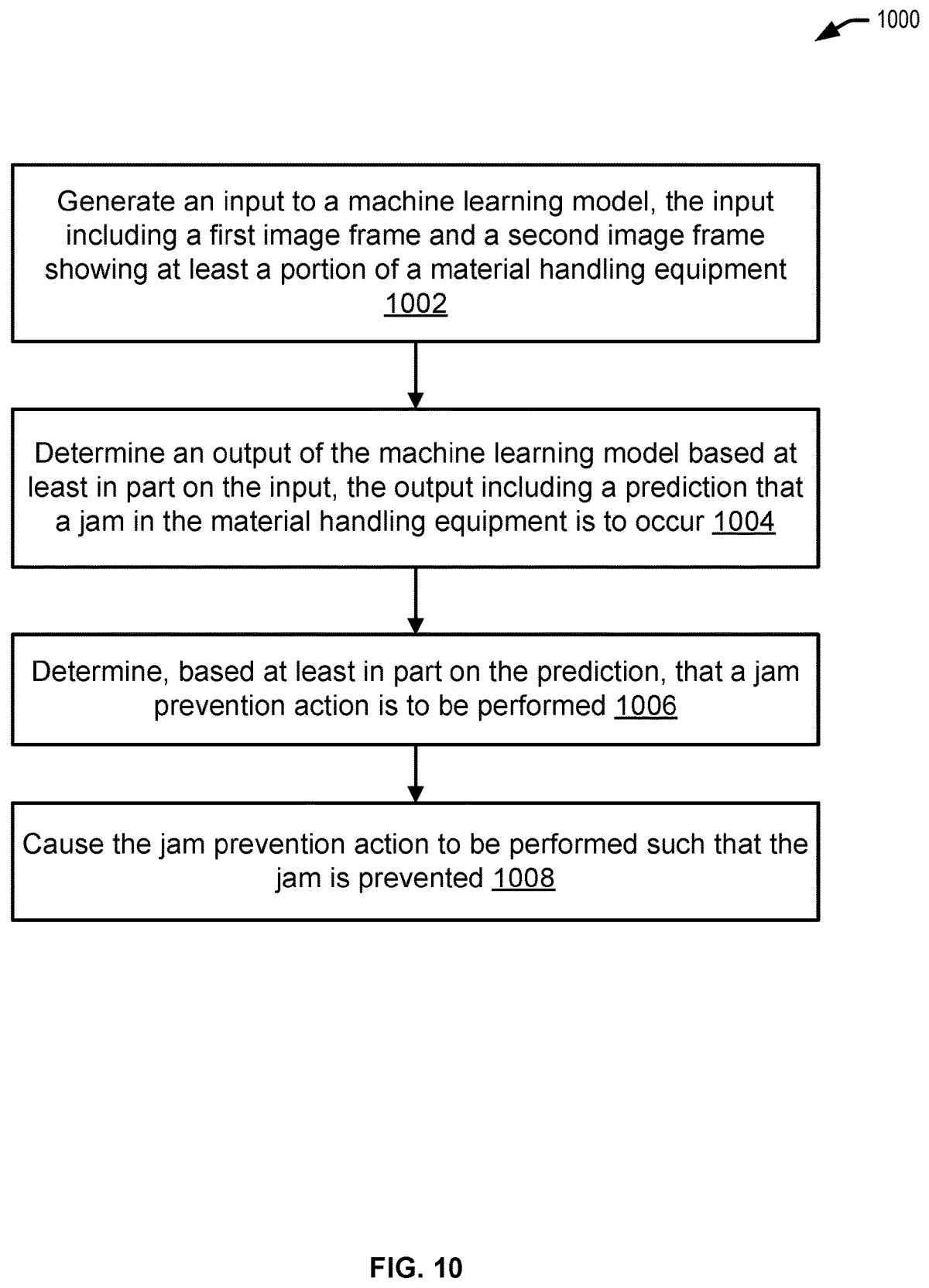

1000

Generate an input to a machine learning model, the input including a first image frame and a second image frame showing at least a portion of a material handling equipment
1002

Determine an output of the machine learning model based at least in part on the input, the output including a prediction that a jam in the material handling equipment is to occur 1004

Determine, based at least in part on the prediction, that a jam prevention action is to be performed 1006

Cause the jam prevention action to be performed such that the jam is prevented 1008

Figure 11:
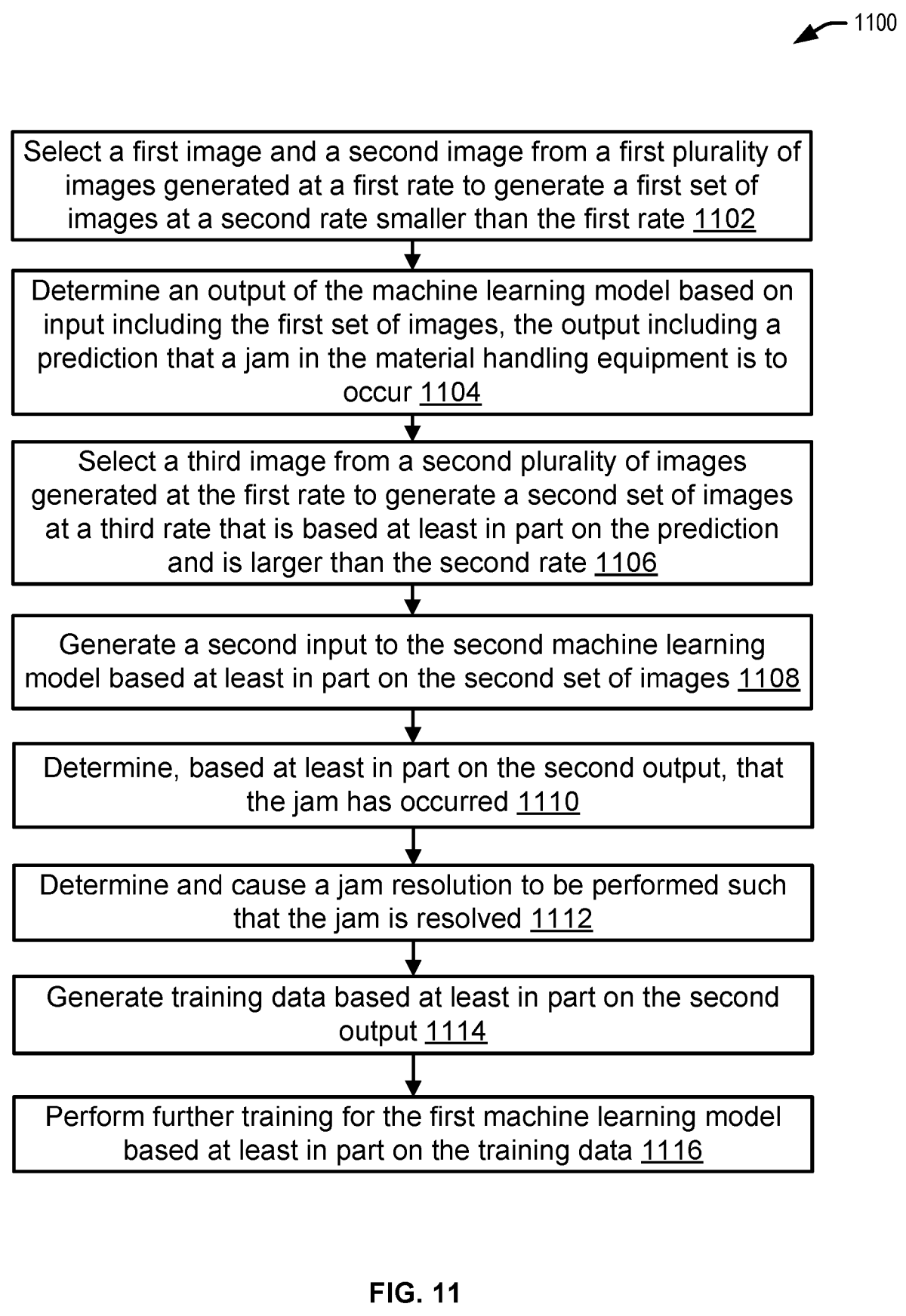

Select a first image and a second image from a first plurality of images generated at a first rate to generate a first set of images at a second rate smaller than the first rate 1102

Determine an output of the machine learning model based on input including the first set of images, the output including a prediction that a jam in the material handling equipment is to occur 1104

Select a third image from a second plurality of images generated at the first rate to generate a second set of images at a third rate that is based at least in part on the prediction and is larger than the second rate 1106

Generate a second input to the second machine learning model based at least in part on the second set of images 1108

Determine, based at least in part on the second output, that the jam has occurred 1110

Determine and cause a jam resolution to be performed such that the jam is resolved 1112

Generate training data based at least in part on the second output 1114

Perform further training for the first machine learning model based at least in part on the training data 1116

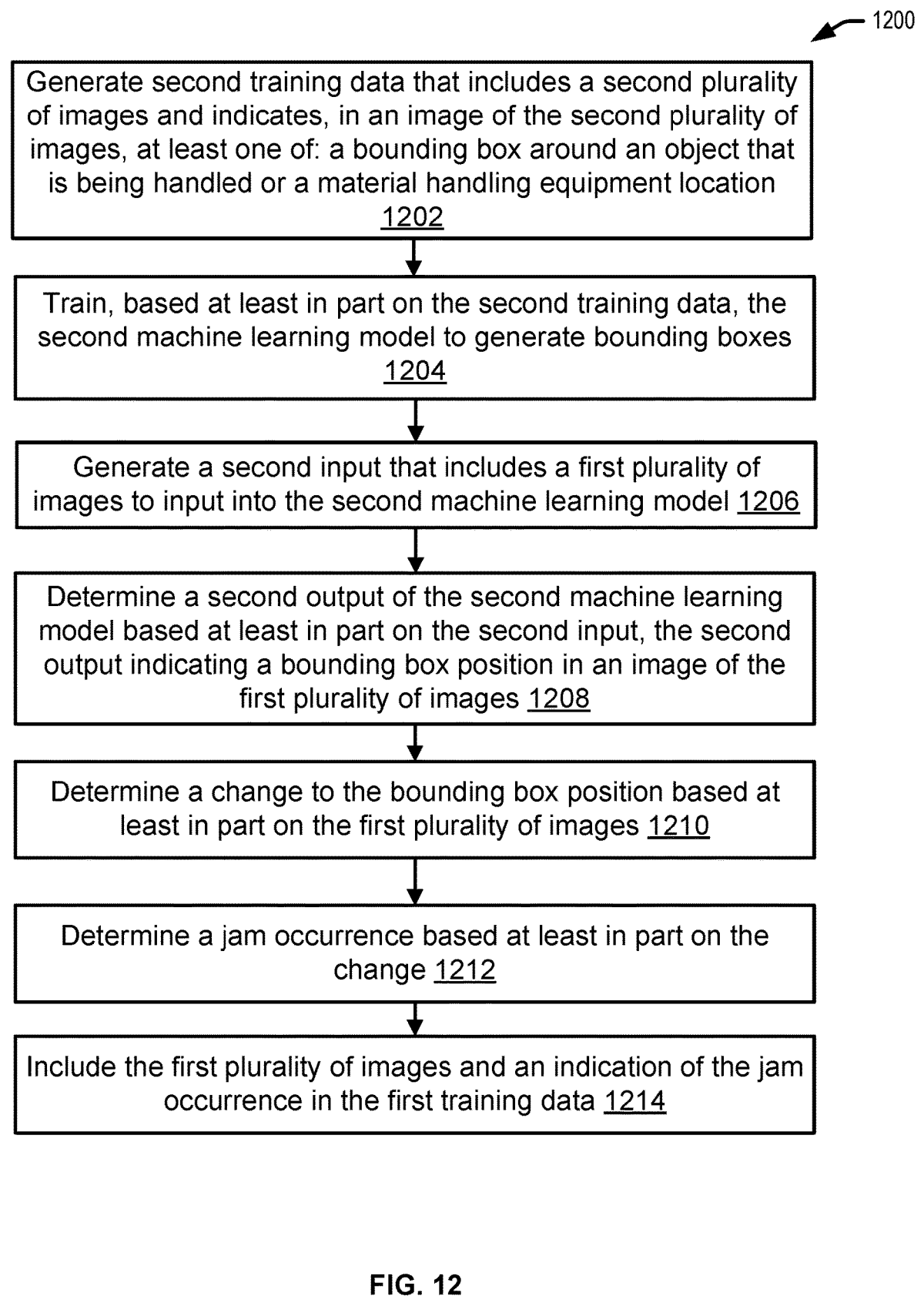

Generate second training data that includes a second plurality of images and indicates, in an image of the second plurality of images, at least one of: a bounding box around an object that is being handled or a material handling equipment location
1202

Train, based at least in part on the second training data, the second machine learning model to generate bounding boxes
1204

Generate a second input that includes a first plurality of images to input into the second machine learning model 1206

Determine a second output of the second machine learning model based at least in part on the second input, the second output indicating a bounding box position in an image of the first plurality of images 1208

Determine a change to the bounding box position based at least in part on the first plurality of images 1210

Determine a jam occurrence based at least in part on the change 1212

Include the first plurality of images and an indication of the jam occurrence in the first training data 1214

FIG. 12

PREDICTIVE MATERIAL HANDLING EQUIPMENT JAM PREVENTION

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished or incorrectly finished tasks, and, in general, poor system performance.

BRIEF DESCRIPTION OF THE DRAWINGS

Various embodiments in accordance with the present disclosure will be described with reference to the drawings, in which:

FIG. 10 shows an example of a flow for using a machine learning model to predict and prevent jams in material handling equipment, according to some embodiments of the present disclosure;

FIG. 11 shows an example of a flow for processing images to be used in predicting and preventing jams in material handling equipment, according to a particular embodiment;

FIG. 12 shows an example of a flow for generating training data and training machine learning models to predict and prevent jams in material handling equipment, according to a particular embodiment.

DETAILED DESCRIPTION

Figure 1:
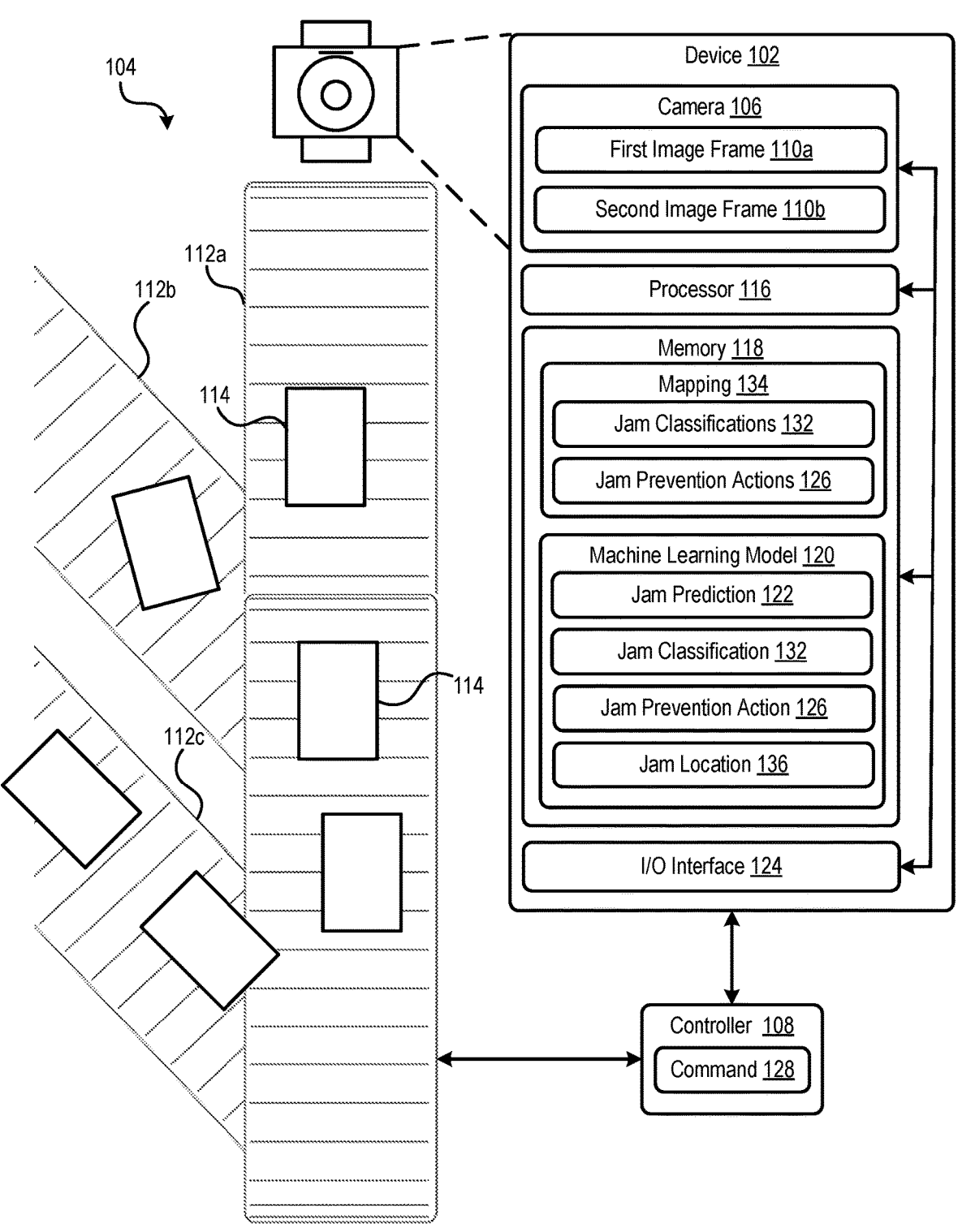
FIG. 1 illustrates an example of a device for predicting and preventing jams on material handling equipment, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, predicting and preventing jams in material handling equipment based on inputting images from video into a machine learning model. In an example, A camera and a computer system are used to monitor objects (containers of items, such as totes, bags, etc. or the items themselves) transported on a material handling equipment. The two components may, but need not, be integrated together as a single device. The camera can generate a video including image frames that show at least a portion of the material handling equipment. The computer system can generate an input to a machine learning model that includes the image frames. The machine learning model can generate an output based at least in part on the input that includes a prediction that a jam in the material handling equipment is about to occur within a next time interval. The output can also include a classification of the jam. The classification of the jam can indicate a cause of the jam. Based at least in part on the classification, the computer system can determine a jam prevention action to perform to prevent the predicted jam from occurring. The computer system can also cause the jam prevention action to be performed within the next time interval in association with the object, preventing the object from becoming involved in the predicted jam.

To illustrate, consider an example of a conveyer belt system for transporting totes. The conveyer belt system can include multiple merging lanes that can merge totes from the merging lanes onto a main conveyer belt lane. The conveyer belt system can be monitored using a device including a camera that can record video as totes are transported along the conveyer belt system. In some cases, one or more totes on the conveyer belt system may become jammed. This can prevent the one or more totes as well as additional upstream totes from being transported along the conveyer belt system. Before a jam occurs, the device can input video recorded by the camera into a machine learning model. The machine learning model can predict that a jam will occur involving a first tote from a merging lane colliding with a second tote on the main conveyer belt lane. Based on the prediction, the device can determine and execute a jam prevention action to prevent the jam. For example, the device can cause the merging lane to cease transportation of totes until the second tote transported on the main conveyer belt lane has passed the location where the first tote and the second tote were predicted to have collided. This can prevent the first tote and the second tote from creating a jam on the conveyer belt system.

Embodiments of the present disclosure provide various technological advantages. For instance, a jam in one region of the material handling equipment can cause a stoppage of the whole system due to blockage. Additionally, jams can damage the material handling equipment. By quickly predicting and preventing jams in real time, the condition and lifespan of the material handling equipment can be preserved and extended by at least improving the operational conditions of the material handling equipment. Further, reduced jams can allow for a higher throughput of objects in the material handling equipment. In cases where jams do occur, jam resolution actions can be determined and implemented to automatically resolve the jams. And images from video recorded for the jam can be used to update and re-train the machine learning model, further improving the accuracy of the jam predictions.

In the interest of clarity of explanation, embodiments may be described herein in connection with material handling equipment. However, the embodiments are not limited as such. Instead, the embodiments may similarly apply to operating on any objects by any system. For example, the embodiments may similarly apply to a manufacturing system, supply chain distribution center, airport luggage system, or other systems using robot stations to perform various automated and, in some instances, autonomous operations. Further, embodiments may be described herein in connection with jams. However, the embodiments are not limited as such and similarly and equivalently apply to any flow of objects. For example, the embodiments may apply to when rate of objects being handled by a material handling equipment drops below a predefined rate. In this case, the embodiment may predictively determine the flow rate drop and trigger an action to prevent this drop.

Turning to FIG. 1, the figure illustrates an example device 102 for predicting and preventing jams on material handling equipment 104, according to embodiments of the present disclosure. Although FIG. 1 depicts a conveyer belt system, the material handling equipment 104 can be any other system that can move packages (in containers or without containers). For example, the material handling equipment 104 can further include a chute system, a pipe system, mobile robots that move between locations, and the like.

The material handling equipment 104 can include multiple lanes 112a-c, such as a main lane 112a and merging lanes 112b-c that feed into the main lane 112a. The lanes 112a-c can transport objects 114 such as packages, totes, or containers. Some or all components of the material handling equipment 104 can be controlled by a controller 108. The objects 114 on the material handling equipment 104 may be susceptible to jams, particularly at points where the merging lanes 112b-c deliver objects 114 to the main lane 112a. Jammed objects 114 may be stuck in one location on the material handling equipment 104 and may also prevent other objects 114 behind the jammed objects 114 from moving along the material handling equipment 104, thus worsening the jam. Jams can be predicted and prevented or mitigated using the device 102.

The device 102 may include one or more cameras 106 (or a set of optical sensors) that can capture images, such as ones forming a video (such as image frames 110a-b), showing at least a portion of the material handling equipment 104. The device 102 can also include one or more processors 116, one or more memories 118, and an input/output (I/O) interface 124. The memory 118 can store program code of a machine learning model 120. As the camera 106 is recording video to generate image frames 110a-b, the processor 116 can process and input the image frames 110a-b into the machine learning model 120. The processing can include selecting certain images (e.g., sampling them so that the input uses a different rate than the video frame rate) and/or changing their resolution. The machine learning model 120 can generate jam predictions 122 as output based at least in part on the input. In some examples, the jam predictions 122 may be predicted as happening in the near future, such as within the next ten or thirty seconds. As used herein, a jam prediction can include a prediction about a future occurrence of a jam. The prediction can be binary (e.g., to occur or not to occur), can include a likelihood of occurrence (e.g., a 70% probability that the jam is to occur), a classification of the jam, a likelihood of the classification (e.g., 90% probability that the jam is of a particular type), and/or other prediction-related information. The device 102 can then determine a jam prevention action 126 based on the jam prediction 122. After generating the jam prevention action 126, the I/O interface 124 can output a command 128 to the controller 108, causing the controller 108 to control a component of the material handling equipment 104 to perform the jam prevention action 126. For example, the controller 108 may pause or increase a speed of one of the lanes 112a-c to prevent certain objects 114 from colliding. This can prevent the predicted jam from occurring. After the controller 108 or the jam prevention mechanism 130 performs the jam prevention action 126, the I/O interface 124 can receive a response from the controller 108 confirming that the jam prevention action 126 has been performed.

The machine learning model 120 can be included in the device 102 onsite in order to reduce latency in generating the jam prediction 122. Reduced latency can allow the device 102 predict and prevent jams in real time, before the jams occur. In some examples, the machine learning model 120 can be a classifier. In other embodiments, the machine leaning model 120 can be included in a remote system (e.g., in an edge server or in a set of servers providing a cloud computing service) with which the device 102 interacts. In such embodiments, the device 102 can process and send the images to the remote system to then receive an output thereof. Such output can be similar to the output described herein next.

In response to receiving the input including the first image frame 110a and the second image frame 110b, the machine learning model 120 can generate the jam prediction 122 and a jam classification 132. The jam classification 132 can correspond to a root cause of the jam prediction 122. Examples of the root cause can include colliding objects 114 from merging lanes 112b-c, too many objects 114 on the lanes 112a-c, a lane 112 moving too slowly, etc. Associations between jam classifications 132 and jam prevention actions 126 can be stored in a mapping 134 in the memory 118. After receiving the output that includes the jam prediction 122 and the jam classification 132, the processor 116 can access the mapping 134 to identify a jam prevention action 126 associated with the jam classification 132. That jam prevention action 126 can then be performed by the device 102 or outputted to the controller 108 or jam prevention mechanism 130. In other examples, instead of storing a mapping 134 in the memory 118, the machine learning model 120 can predict the jam prevention action 126 that should be taken to prevent the jam prediction 122 from happening.

In some examples, the output from the machine learning model 120 can also include a jam location 136 for the jam prediction 122. The jam location 136 can be outputted to the controller 108 via the I/O interface 124 to activate the correct component in the material handling equipment 104. For example, if the jam location 136 of the jam prediction 122 is the merge point between merging lane 112b and the main lane 112a, the controller 108 can slow down the merging lane 112b until the main lane 112a is clear of objects 114 at the jam location 136.

Figure 2:
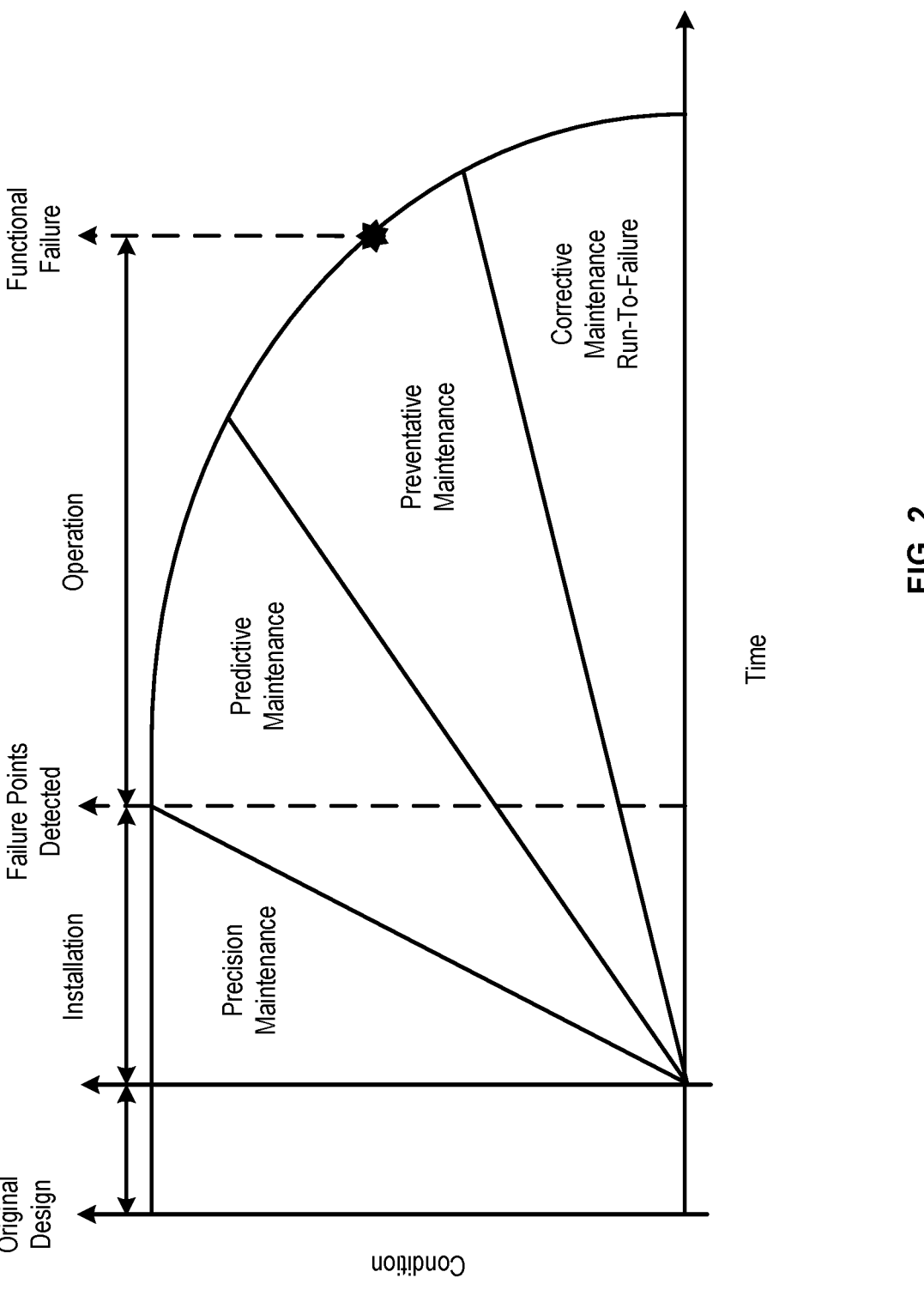
FIG. 2 illustrates a graph depicting a conventional lifespan of material handling equipment, according to some embodiments of the present disclosure.

FIG. 2 illustrates a graph depicting a conventional lifespan of material handling equipment 104, according to some embodiments of the present disclosure. Generally, the approach is to perform maintenance operations on the equipment 104 to improve its operations. Such approach, however, does not predictively prevent jams. The graph includes phases of the condition of the material handling equipment 104 over time. A first phase involves actions taken from original design of the material handling equipment 104 to the installation of the material handling equipment 104, when conditions are at their highest levels.

In the next phase between installation and the point at which failures can begin to be detected, the condition of the material handling equipment 104 may remain relatively constant. The condition may be maintained without significant deterioration due to precision maintenance that may only be feasible or possible soon after installation. As time goes on, the material handling equipment 104 can then experience a decline in condition in the next phase until functional failure of the material handling equipment 104 is experienced. In this last phase, predictive maintenance can be used to monitor likely sources of failure in the material handling equipment 104. For example, vibration sensors or other sensors can be coupled to the material handling equipment 104 to detect anomalous behavior. As the material handling equipment 104 continues to degrade, preventative maintenance can be undertaken. For example, regular inspections can be done to replace or repair certain components. Then, as components begin to fail before prediction or prevention, corrective maintenance is employed to repair the material handling equipment 104. At this point, the material handling equipment 104 condition will degrade as the material handling equipment is run-to-failure. Events such as jams of objects 114 transported by the material handling equipment 104 can contribute to failures or damage to the condition of the material handling equipment 104. Jammed objects 114 may create large backups, which can wear out conveyer belts that are unable to transport the jammed objects 114. Jams can occur relatively quickly, and conventional systems are therefore limited in their predictive maintenance and preventative maintenance.

Figure 3:
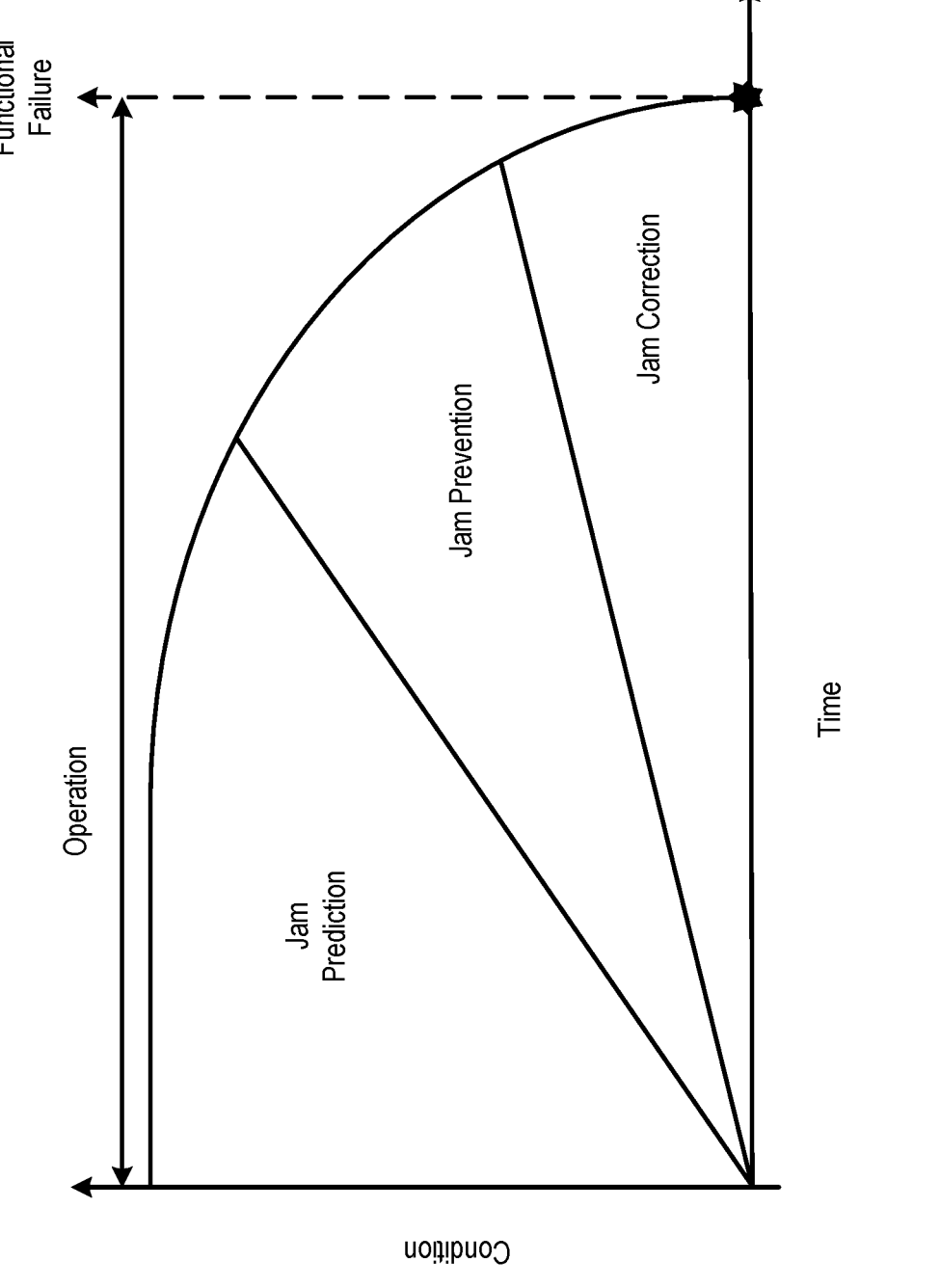
FIG. 3 illustrates a graph depicting an operation of material handling equipment that is monitored by a device that can predict and prevent jams, according to some embodiments of the present invention

In contrast, referring now to FIG. 3, the figure illustrates a graph depicting an operation of material handling equipment 104 monitored by a device that can predict and prevent jams, according to some embodiments of the present invention. During the operation, the material handling equipment 104 can be maintained as described in FIG. 2. Further, during the operation, predictive jam prevention can be implemented. The condition of the material handling equipment 104 can be significantly extended as compared to the conventional system illustrated in FIG. 2 by using the device 102 to perform jam predictions, jam preventions, and jam corrections. Jam predictions can be used to perform jam prevention actions, which can reduce damage to the material handling equipment 104. Additionally, jams that are not successfully predicted or prevented can also be corrected by the device 102.

Figure 4:
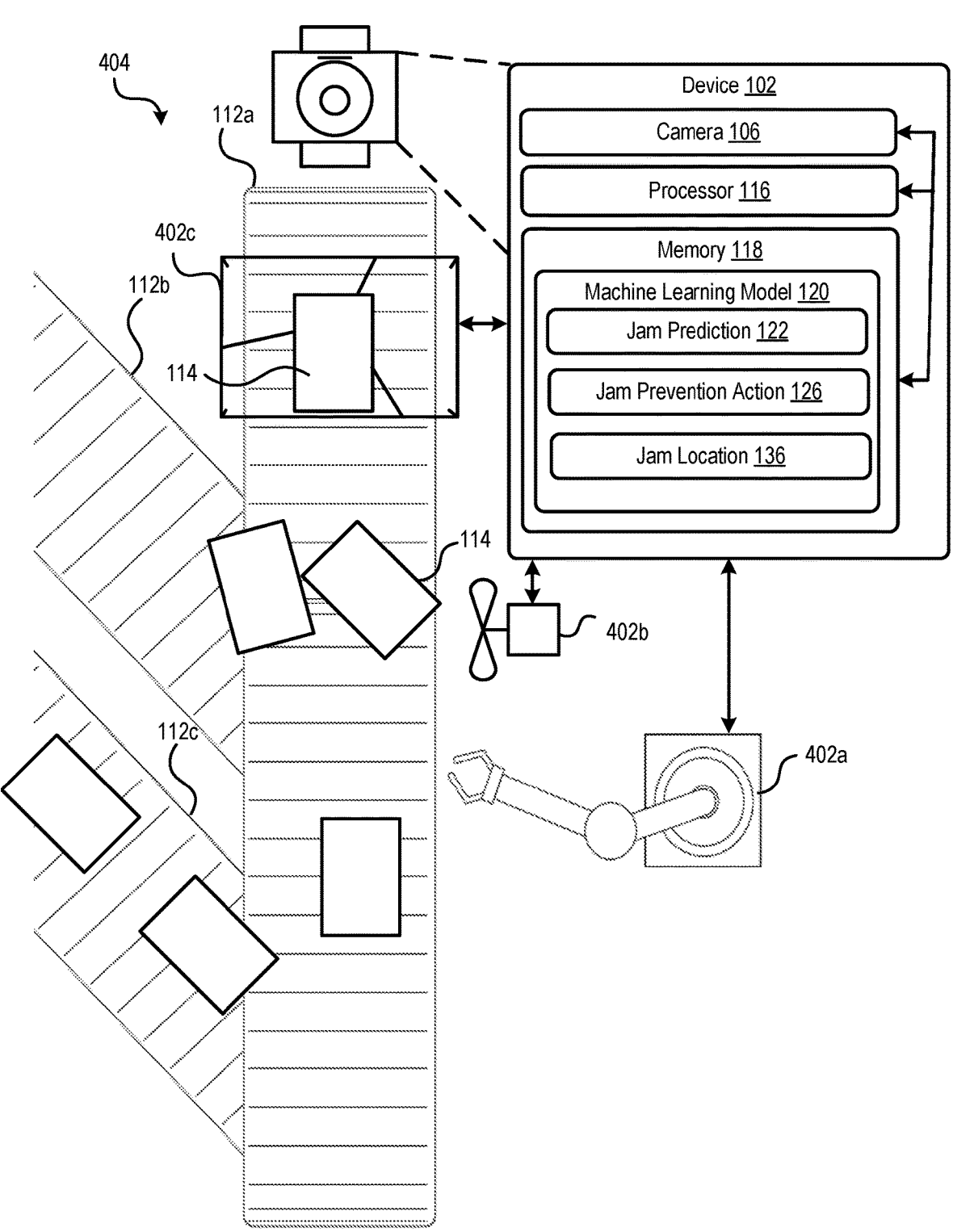
FIG. 4 illustrates another example of a device for predicting and preventing jams on material handling equipment, according to some embodiments of the present disclosure.

FIG. 4 illustrates another example of a device 102 for predicting and preventing jams on material handling equipment 404, according to some embodiments of the present disclosure. Instead of including a controller 108 (as depicted in FIG. 1), the device 102 may include or may be coupled to one or more jam prevention mechanisms 402. A jam prevention mechanism 402 may include one or a combination of systems, as described herein next, that may perform the jam prevention action 126 determined by the processor 116 or the machine learning model 120. For example, a first jam prevention mechanism 402a can be an arm that can grab, push, or otherwise move objects 114 at the jam location 136 to prevent or mitigate a jam. A second jam prevention mechanism 402b can be a set of blowers that can blow an object 114 to move it to a different location on one of the lanes 112a-c. A third jam prevention mechanism 402c can be a mechatronic device such as a tote lift that can grab and lift objects 114 to move them to a different location. Further examples can include a set of brushers, a dynamo, air blades, air knives, stoppers, actuators, articulated devices, or any type of mechanism that can move an object 114, a component of the material handling equipment 204, or perform any action that can prevent the jam prediction 122 from occurring. In some examples, the jam prevention mechanisms 402a-c can be used to correct a jam that has already occurred.

Figure 5:
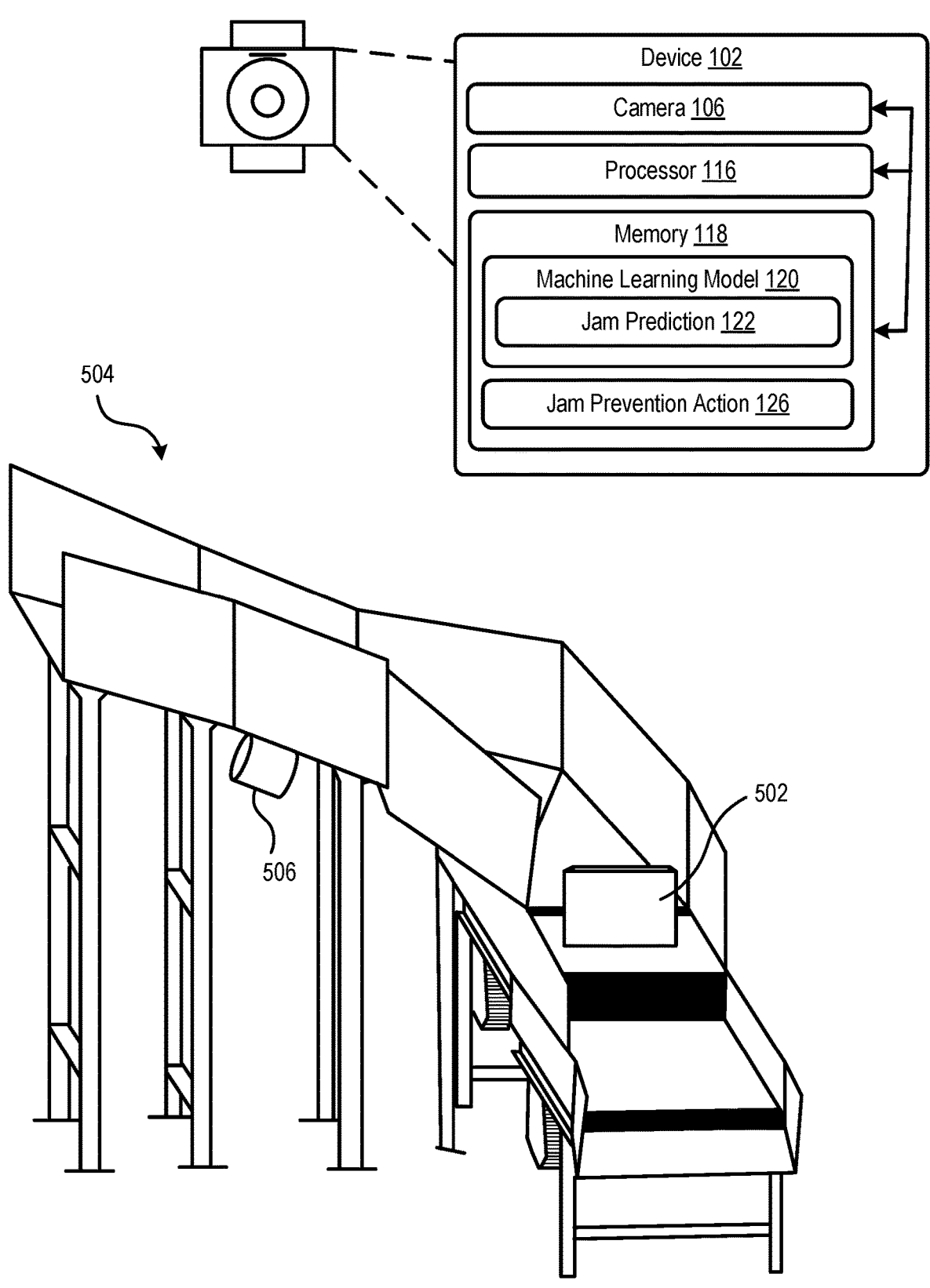
FIG. 5 illustrates another example of a device for predicting and preventing jams on material handling equipment, according to some embodiments of the present disclosure.

FIG. 5 illustrates another example of a device 102 for predicting and preventing jams on material handling equipment 504, according to some embodiments of the present disclosure. The material handling equipment 504 depicted in FIG. 5 is a chute system for transporting objects 502 such as packages. The chute system can guide the objects 502 downward to transport the objects 502. The device 102 can monitor the material handling equipment 504 in a similar manner as described in FIG. 1. That is, the device 102 can record images of the material handling equipment 504 that can be inputted into the machine learning model 120. The machine learning model 120 can determine a jam prediction 122 on the material handling equipment 504. In some examples, it may be sufficient to simply generate a jam prediction 122, without additionally determining a jam classification. The processor 116 can then control a jam prevention mechanism 506 to perform a jam prevention action 126. For example, the jam prevention mechanism 506 can be a dynamo or a set of vibration drums that can produce vibrations to jostle the object 502 (although other possible types of jam prevention mechanisms are possible). The vibrations may move the object 502 to prevent or break up a jam. In a further example, the machine learning model 120 can output an indication a predicted location of the possible jam. Additionally, or alternatively, this predicted location can be determined to correspond to a field of view of the camera that generated the images for the input of the machine learning model 120. In both cases, the jam prevention action 126 can be performed locally to the predicted location (e.g., by activating only a dynamo or a set of vibration drums at or near the predicted location).

Figure 6:
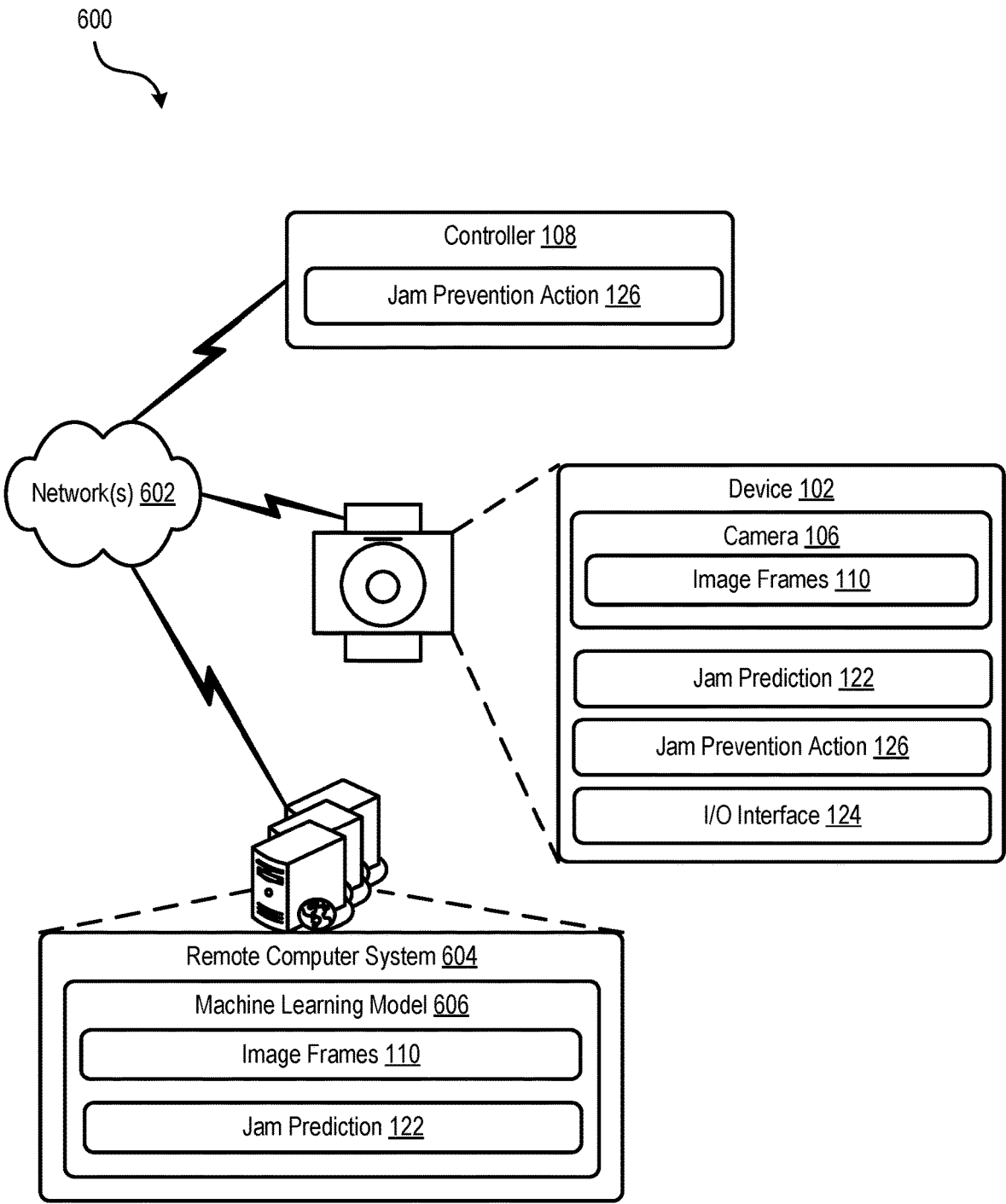
FIG. 6 illustrates an example of a computing environment for predicting and preventing jams in material handling equipment, according to some embodiments of the present disclosure.

FIG. 6 illustrates an example of a computing environment 600 for predicting and preventing jams in material handling equipment, according to some embodiments of the present disclosure. The computing environment 600 can include the device 102 and controller 108 of FIG. 1 and a remote computer system 604. The components of the computing environment 600 can be communicatively connected via one or more networks 602. The networks 602 may include any one or a combination of many different types of networks, such as cable networks, the Internet, wireless networks, cellular networks, and other private or public networks. The device 102 and the remote computer system 604 may be any type of computing device. Additionally, it should be noted that in some embodiments, the remote computer system 604 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. The remote computer system 604 may include one or more servers, perhaps arranged in a cluster or as individual servers not associated with one another.

The remote computer system 604 may be located remotely from the device 102 and controller 108, which can be positioned proximate any of the material handling equipment described herein. The remote computer system 604 can include the machine learning model 606. The camera 106 can generate image frames 110 of the material handling equipment. The device 102 can process and transmit the image frames 110 to the remote computer system 604 via the networks 602 as input for the machine learning model 606. The processing can include selecting certain images (e.g., sampling them so that the input uses a different rate than the video frame rate) and/or changing their resolution. The machine learning model 606 can generate a jam prediction 122 as output based on the inputted image frames 110. The jam prediction 122 can be transmitted to the device 102 via the networks 602. The device 102 can then determine a jam prevention action 126 based on the jam prediction 122. For example, the device 102 may determine a jam prevention action 126 involving shutting down a merge lane on the machine handling equipment. The device 102 can then transmit a command to the controller 108 via the networks 602 to perform the jam prevention action 126.

Figure 7:
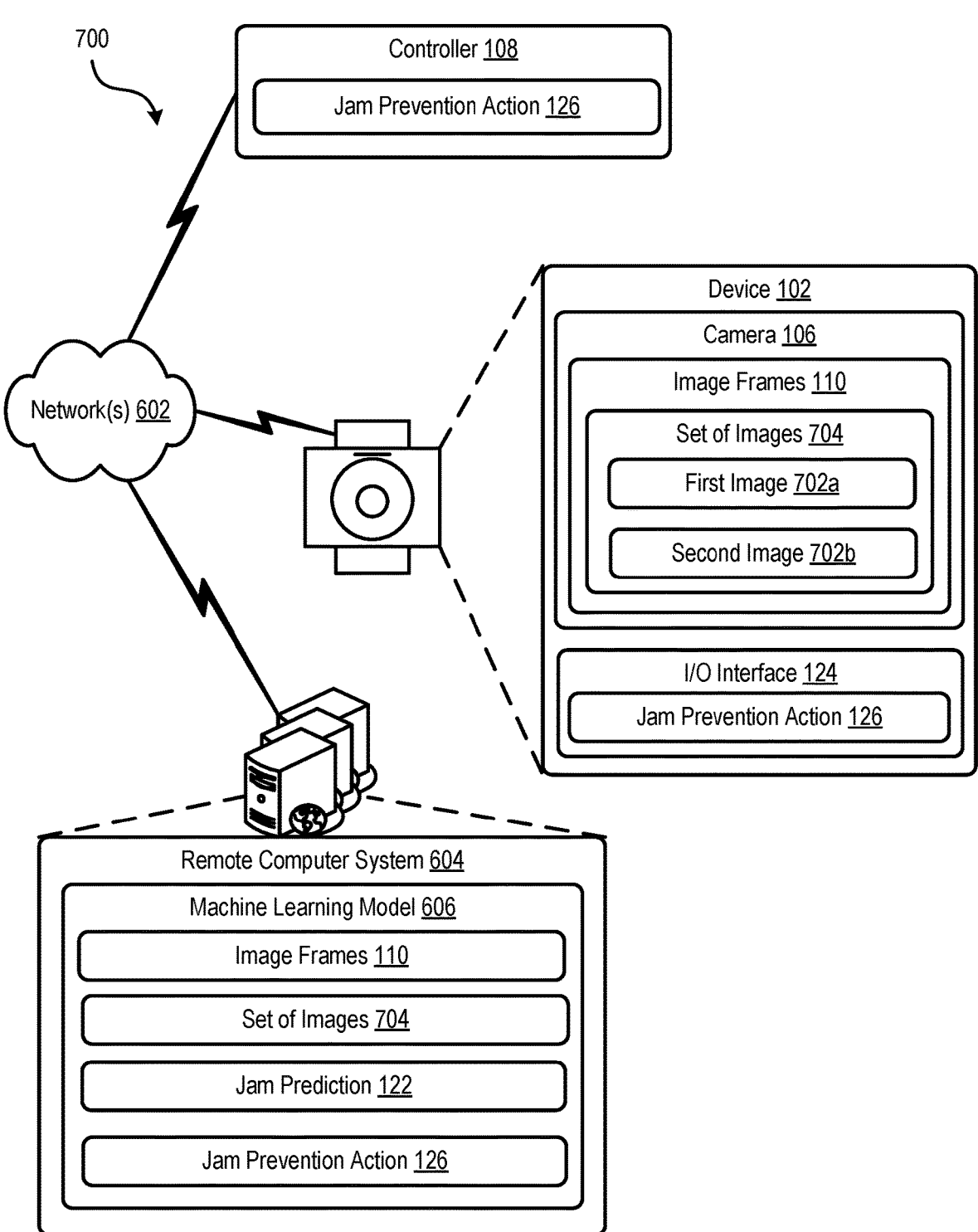
FIG. 7 illustrates another example of a computing environment for predicting and preventing jams in material handling equipment, according to some embodiments of the present disclosure.

In another embodiment, the machine learning model 606 in the remote computer system 604 can additionally determine the jam prevention action 126. Such an embodiment is depicted in FIG. 7, which illustrates another example of a computing environment 700 for predicting and preventing jams in material handling equipment. The device 102 can process and transmit the image frames 110 from the camera 106 to the remote computer system 604 via the networks 602. The remote computer system 604 can input the image frames 110 into the machine learning model 606, and the machine learning model 606 can generate output based on the input. The output can include both the jam prediction 122 and an associated jam prevention action 126. Then, the remote computer system 604 can instruct the controller 108 of the material handling equipment or the I/O interface 124 of the device 102 to perform the jam prevention action 126.

Using a remote machine learning model 606 may introduce increased latency compared to an on-site machine learning model 120 in the device 102. To lessen the latency in the computing environments 600 or 700, the image frames 110 captured by the camera 106 may be pre-processed by the device 102 before being transmitted or inputted into the machine learning model 606. For example, the image frames 110 may be generated by the camera 106 at a first rate. But it may not be necessary to transmit all image frames 110 to the remote computer system 604. Transmitting less image frames 110 may reduce latency in the computing environment 700. So, the device 102 may select a first image 702a and a second image 702b to generate a set of images 704. The set of images 704 may have a frame rate that is smaller than the first rate. This set of images 704 can be the input transmitted to the remote computer system 604 to be inputted into the machine learning model 606.

The device 102 can then receive the output of the machine learning model 606 from the remote computer system 604. The device 102 may also receive data from the remote computer system 604 indicating that the jam prevention action 126 is to be performed. The remote computer system 604 may or may not determine the jam prevention action 126 using the machine learning model 606. Then, the device 102 can control performance of the jam prevention action 126, such as by transmitting a command to the controller 108. Alternatively, the device 102 may determine the jam prevention action 126 and may send data indicating that the jam prevention action 126 is to be performed to the remote computer system 604. The remote computer system 604 can then trigger the performance of the jam prevention action 126, such as by transmitting a command to the controller 108.

A machine learning model, such as any of the machine learning models 120 or 606 described herein above can predict a possible jam, a jam classification of this jam, a possible location of this jam within a material handling equipment, and/or a jam prevention. Given its predictive nature, the machine learning model can be referred to herein as a predictive model. Depending on the predictive output (jam, jam classification, jam location, and/or jam prevention action), the predictive model can be trained using training data.

To train for jam prediction, the training data can include image sets (e.g., each set being image frames from a video), some of which show jams and other may show no jams. The training data can also include labels, where a label can be associated with an image set or with each image and indicates whether a jam is shown or not. The predictive model can be implemented as an artificial neural network that learns to predict the jam based on such training data. In particular, a loss function can be defined, whereby a penalty may be used for an incorrect prediction (e.g., when the artificial neural network predicts a jam when no jam exists or vice versa) and/or a reward may be used for a correct prediction (e.g., when the artificial neural network predicts a jam when the jam exists and/or when it predicts no jam when no jam exists).

To train for jam classification, the training data can also include labels for predefined jam classifications, where a label can be associated with an image set or with each image and indicates the jam classification (if any) corresponding to the shown jam (if any). Here, the predictive model can be implemented or can include a machine learning model classifier. This classifier is trained using a loss function that accounts for predicted classification errors. In particular, a penalty may be used for an incorrect classification (e.g., when the classifier predicts a jam classification when a different jam classification exists) and/or a reward may be used for a correct prediction (e.g., when the classifier predicts the correct jam classification).

To train for jam location, the training data can also include labels for locations within material handling equipment, where a label can be associated with an image set or with each image and indicates a location of a jam (if any). The location can be defined as a bounding box within an image or as a set of coordinates defined relative to a coordinate system (e.g., with an origin in the bottom left of images). Here, the predictive model can be implemented as an artificial neural network. This network is trained using a loss function that accounts for predicted location errors. In particular, a difference between an actual jam location (as indicated in a label) and a predicted jam location (as output by the artificial neural network during the training) can be computed, and the difference can be a variable of the loss function.

To train for jam prevention action, the training data can also include labels for predefined jam prevention actions, where a label can be associated with an image set or with each image and indicates the correct jam prevention action to implement (if any) corresponding to the shown jam (if any). Here, the predictive model can be implemented or can include a machine learning model classifier. This classifier is trained using a loss function that accounts for predicted jam prevention action errors. In particular, a penalty may be used for an incorrect jam prevention action (e.g., when the classifier predicts a jam prevention action when a different jam prevention action should have been taken as indicated by a label) and/or a reward may be used for a correct prediction (e.g., when the classifier predicts the correct jam prevention action).

As explained herein above, training data is used to train the predictive model. The training data can be generated using different techniques. In one example technique, an automated process that involves a jam detection model can be used. The jam detection model can include a machine learning model trained to annotate images with bounding boxes around objects shown in images and/or around possible jam locations. The jam detection model can also include a jam detection algorithm that can determine jam classifications based on location changes to bounding boxes across images and jam prevention actions based on the jam classification.

Referring the machine learning model of the jam detection model, to train this model, training data is also used. Here, videos capturing operations of material handling equipment over a period of time (e.g., one day) can be stored in a datastore. A log of the operations can also be stored and can include timestamps corresponding to times when jams actually occurred. The log can be processed to determine the timestamps. Given these timestamps, short videos (e.g., thirty seconds before or around the timestamps) may be retrieved from the datastore. Image frames in these videos are then annotated with bounding boxes (e.g., around objects that were being handled and/or around jam locations). The annotations are used as labels. These images frames and labels are used in the training, whereby the machine learning model learns to generate bounding boxes (e.g., image annotations about detected object locations and detected jam locations). In particular, a difference between an actual bounding box (as indicated in a label) and a predicted bounding box (as output by the machine learning model during the training) can be computed, and the difference can be a variable of the loss function.

Once this machine learning model is trained, the same and/or additional short videos (determined based on the log and the stored videos) can be used to generate images frames (e.g., by sampling the short videos such that a smaller video frame is used). These image frames are input to the machine learning model that then output bounding box information (e.g., indicating the boundaries of each bounding box in each image). The image frames and the bounding box information are input to the jam detection algorithm. Here, this algorithm tracks the change to a location of a bounding box across the image frames. Depending on the change, a type of jam can be detected. For example, if a location of a bounding box corresponding to an object does not change across image frames, whereas the locations of other bounding boxes change, a single object jam is detected. The unchanging location of the bounding box can be the jam location. In comparison, if the locations of multiple bounding boxes do not change across multiple image frames, a multi-object jam is detected. The average of the locations can be the jam location. These are two mere examples of outputs of the jam detection algorithm. Generally, this algorithm can be implemented as a set of rules (e.g., "if-then" rules) that, depending on the change(s) to bounding box location(s) can indicate the type of jam and its location. Each type can correspond to a jam classification and can be associated with a predefined jam prevention action. As such, by processing the short videos through the machine learning model and the jam detection algorithm, it becomes possible to generate training data indicating whether a set of image frames shows a jam or not, the jam classification, the jam location, and/or the jam prevention action. Such training data can then be used to train the predictive model as explained herein above.

In an example, the predictive model may process image frames at a first rate (e.g., two image frames per second) that is smaller than a second rate of the video (e.g., one-hundred twenty image frames per second). Upon predicting of a jam over a next period of time (e.g., thirty seconds), the processing rate can increase to a third rate (e.g., more than two image frames per second and up to one-hundred twenty image frames per second). These image frames can be input to the predictive model during the period of time such that the jam prediction can be continuously refined with more robustness (e.g., given the higher image frame rate).

Additionally or alternatively, upon the jam prediction, the jam detection model (e.g., including the machine learning model and the jam detection algorithm described herein above) can be used to determine whether a jam actually occurred or not. In particular, the image frames can be input to this model at the first rate, second rate, third rate, or some other image frame rate. The output of the jam detection model can indicate whether the actual jam occurred and, if so, a jam prevention action that should be taken. This jam prevention action can, but need not, be different from a prediction of the predictive model.

Additionally or alternatively, upon the jam prediction, the jam detection model can be used to generate additional training data from the image frames. Such and other similarly generated training data can be collected over time and used to further train the predictive model.

In an example, the initial training of the jam detection model and the predictive model is performed on a remote computer system (e.g., the remote computer system 604). The trained predictive model can be sent to a device (e.g., the device 102) for use thereat. If so, the trained jam detection model can also be sent to the device for use thereat, or the device can send data to the computer system to then receive output of the jam detection model from the computer system. Alternatively, the trained predictive model can be used by the remote computer system based on data from the device such that the remote computer system sends an output of this model to the device. In this case, the trained jam detection data can be used by the remote computer system or can be sent to the device for use thereat.

In an example, the initial training of the predictive model is performed on the remote computer system and this model is pushed to the device upon completion of the initial training. Subsequently, if the trained jam detection model is also pushed to the device, additional training data can be collected by the device (e.g., based on image frames generated by a camera of the device) and used locally by the device to further train the predictive model. If the trained jam detection model is not pushed to the device, the image frames can be sent to the computer system that then generates and returns the additional training data to the device such that the device can further train the predictive model.

Flows are described in connection with the next figures. Operations of the example flows can be implemented by a system (which may include any of the devices described herein above and/or any remote computer system described herein above). Instructions for performing the operations can be stored as computer-readable instructions on a nontransitory computer-readable medium of the system. As stored, the instructions represent programmable modules that include code executable by a processor(s) of the system. The execution of such instructions configures the system to perform the specific operations shown in the figures and described herein. Each programmable module in combination with the processor represents a means for performing a respective operation(s). While the operations are illustrated in a particular order, it should be understood that no particular order is required.

Figure 8:
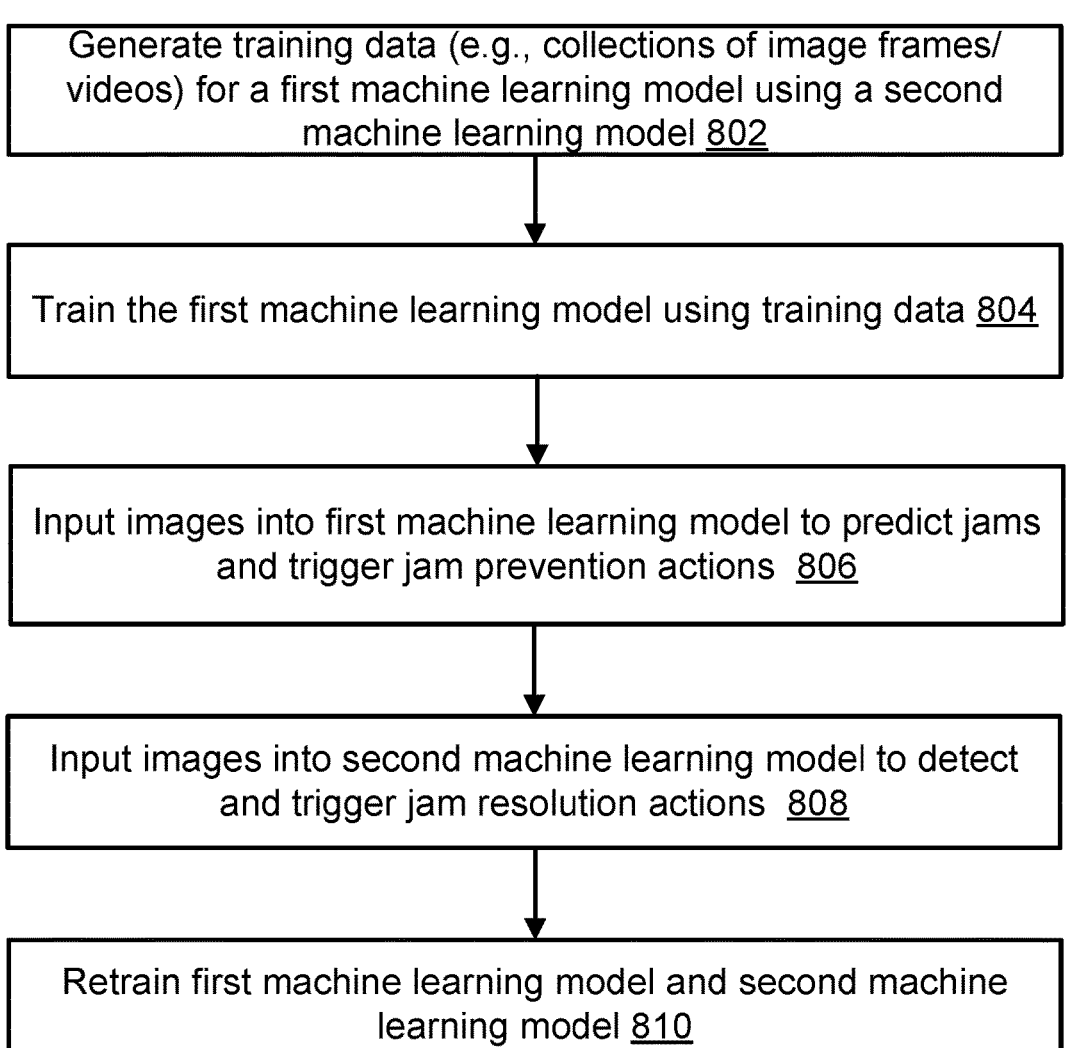
FIG. 8 shows an example of a flow for training machine learning models to predict and prevent jams in material handling equipment, according to some embodiments of the present disclosure.
Figure 9:
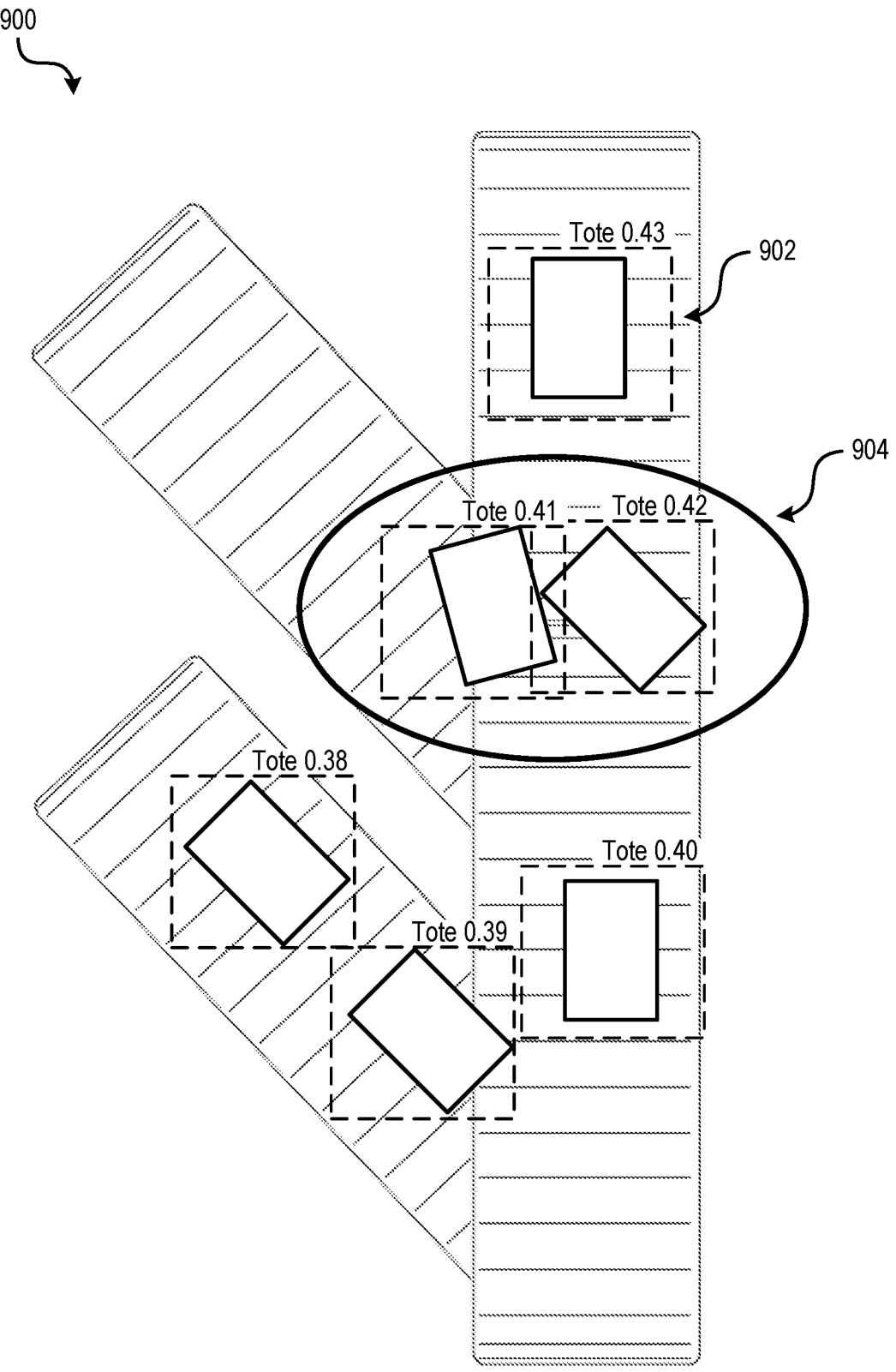
FIG. 9 illustrates an example of a training data image, according to some embodiments of the present disclosure.

FIG. 8 shows an example of a flow 800 for training machine learning models to predict and prevent jams in material handling equipment, according to some embodiments of the present disclosure. In an example, the flow 800 includes operation 802, involving generating training data for a first machine learning model (e.g., the predictive model) using a second machine learning model (e.g., the jam detection model). The first machine learning model can be used to determine jam predictions in material handling equipment after being trained. Before the first machine learning model is trained, the second machine learning model can be used to generate first training data. The first training data can include a first plurality of images captured by a camera monitoring material handling equipment, such as image frames from videos and/or the videos themselves. The first plurality of images may include objects being transported along the material handling equipment. Some of the objects may be experiencing a jam. The first training data can also include one or more labels indicating the jam occurrence. In some examples, the second machine learning model may be a jam detection algorithm that can generate the labels. An example of the first training data is depicted in FIG. 9, which illustrates an example of a training data image 900 according to some embodiments. The training data image 900 can include bounding boxes 902 identifying totes transported on a conveyer belt system and/or jam locations. Additionally, the output of the second machine learning model can include identifiers of the bounding boxes, and these identifiers can be included in the labels. Further, the output of the second machine learning model can indicate, for each bounding box, a confidence level associated with the detection of the bounding box. This confidence level can be quantified as a likelihood (e.g., 0.41 corresponding to a 41% likelihood that the bounding box is correctly detected). A thresholding function can be applied to remove the low confidence detections (e.g., any detected bounding having a likelihood value lower than a predefined threshold value, such as 40% or some other predefined threshold, can be removed and not used in the training data; otherwise, the bounding box and its related data are included in the training data).

Referring back to FIG. 8, in an example, the flow 800 includes operation 804, involving training the first machine learning model using the first training data. The first machine learning model can thereafter output jam predictions in response to inputted images. In some examples, the first machine learning model may also generate outputs including jam classifications, jam prevention actions, or jam locations.

In an example, the flow 800 includes operation 806, involving inputting images of the material handling equipment into the first machine learning model. The images may be detected in real time by the camera. The first machine model can output jam predictions for the material handling equipment, which can trigger jam prevention actions to prevent the predicted jams from occurring.

In an example, the flow 800 includes operation 808, involving inputting images of the material handling equipment into the second machine learning model. The images can be inputted in response to the first machine model outputting the jam prediction. The images can include the images inputted into the first machine learning model, as well as subsequent images. The subsequent images can include images recorded during the time interval in which the first machine learning model predicted that the jam prediction would occur. The second machine learning model can generate an output based at least in part on the input. The output can include a jam detection of the inputted images, indicating that the jam prevention actions failed. The jam detection may trigger the device to cause jam resolution actions to be performed. For example, the device may cause a controller or a jam prevention mechanism to move, blow, push, shake, or vibrate the objects in the jam or the material handling equipment to mitigate the jam.

In an example, the flow 800 includes operation 810, involving retraining the first machine learning model and the second machine learning model using images collected by the camera before, during, and after the jam occurred. Retraining the machine learning models can improve future jam predictions, preventions, and resolutions.

FIG. 10 shows an example of a flow 1000 for using a machine learning model to predict and prevent jams in material handling equipment, according to some embodiments of the present disclosure. In an example, the flow 1000 includes operation 1002, where the device generates an input to the machine learning model (e.g., the predictive model). The input can include a first image frame and a second image frame showing at least a portion of the material handling equipment.

In an example, the flow 1000 includes operation 1004, where the device determines an output of the machine learning model based at least in part on the input. The output can include a prediction that a jam in the material handling equipment is to occur. The jam can involve an object being handled by the material handling equipment shown in the first image frame and the second image frame. The device can also determine a classification of the jam and a predicted location of the jam in the material handling equipment. The classification and the predicted location can be indicated in the output of the machine learning model.

In an example, the flow 1000 includes operation 1006, where the device determines, based at least in part on the prediction, that a jam prevention action is to be performed. The device can determine the jam prevention action based at least in part of the output of the machine learning model, which can indicate the jam prevention action to perform. The jam prevention action can be determined based at least in part on the classification.

In an example, the flow 1000 includes operation 1008, where the device causes the jam prevention action to be performed such that the jam is prevented. The jam prevention action can be performed at least at the predicted location. For example, the device may cause the jam prevention action by sending a command indicating the jam prevention action and the predicted location to a controller of the material handling equipment. The jam prevention action can be executed by the controller to control the material handling equipment. In some examples, the controller can be included in the device and can receive a command to control the jam prevention action by handling the object. Such a controller can be coupled with a jam prevention mechanism that can handle the object. The jam prevention mechanism can include at least one of: a dynamo, a set of arms, a set of blowers, or a set of vibration drums.

FIG. 11 shows an example of a flow 1100 for processing images to be used in predicting and preventing jams in material handling equipment, according to a particular embodiment. Here, a first machine learning model (e.g., the predictive model) is used to predict a jam and a second machine learning model (e.g., the jam detection model) is used to monitor the occurrence of the predicted jam. In an example, the flow 1100 includes operation 1102, involving selecting a first image and a second image from a first plurality of images. The first plurality of images may be received from a camera and may be generated at a first rate. The first image and second image can be selected to generate a first set of images at a second rate smaller than the first rate. If a remote computer system is used, the first set of images can be transmitted by the device to the remote computer system executing a first machine learning model.

In an example, the flow 1100 includes operation 1104, involving determining an output of the first machine learning model based on input including the first set of images. The output can include a prediction that a jam in the material handling equipment is to occur within a next time interval. The remote computer system can transmit the prediction to the device.

In an example, the flow 1100 includes operation 1106, involving selecting a third image from a second plurality of images. The second plurality of images can be received from the camera and can be generated at the first rate. The third image can be combined with the first image and the second image to generate a second set of images at a third rate. The third rate can be larger than the second rate. The third rate being a higher frame rate than the first rate or second rate can create a more accurate input for a second machine learning model, which can confirm the prediction of the jam or even detect the predicted jam. The third image can be selected to show at least a predicted location of where the predicted jam would occur in the material handling equipment. The third image can also be selected as an image that depicts the predicted location at the time interval in which the jam is predicted to occur.

In an example, the flow 1100 includes operation 1108, involving generating a second input to the second machine learning model based at least in part on the second set of images. The device can transmit the second input to the remote computer system to be inputted into the second machine learning model. The second machine learning model can generate a second output based at least in part on the second input, which can be transmitted by the remote computer system to the device. The second output can indicate whether the jam has occurred or not.

In an example, the flow 1100 includes operation 1110, involving determining, based at least in part on the second output, that the jam has occurred. For example, the second output may include a label indicating jam occurrence. In an example, the flow 1100 includes operation 1112, involving determining and causing a jam resolution to be performed such that the jam is resolved. For example, the device can determine a jam resolution action to perform. Alternatively, the second machine learning model can determine the jam resolution as part of the second output. The device or the remote computer system can then cause the jam resolution action to be performed. Jam resolution actions can involve using a dynamo, a set of blowers, a pusher, a set of arms, a set of vibrators, or any other type of jam resolution device to resolve the jam. The objects involved in the jam may be moved and separated directly, or components of the material handling equipment may be operated to resolve the jam.

Additionally or alternatively, the device can transmit an alert indicating that the jam has occurred to a user device. The alert may indicate that the jam has occurred. The alert may also indicate at least one of the predicted locations, an actual location of the jam in the material handling equipment as determined from the second output, or the third image. The alert may allow an operator of the material handling equipment to resolve the jam.

In an example, the flow 1100 includes operation 1114, involving generating training data based at least in part on the second output. The training data can include image frames recorded before, during, and after the jam. In an example, the flow 1100 includes operation 1116, involving performing further training for the first machine learning model based at least in part on the training data. The further training may enable the first machine learning model to better predict jams and successful jam prevention actions.

FIG. 12 shows an example of a flow for generating training data and training machine learning models to predict and prevent jams in material handling equipment, according to a particular embodiment. Here, a second machine learning mode (e.g., the jam detection model) is trained to generate training data for a first machine learning model (e.g., the predictive model). In an example, the flow 1200 includes operation 1202, involving generating second training data for the second machine learning model. The second training data can include a second plurality of images. At least one of the images in the second plurality of images can indicate a bounding box around an object that is being handled on material handling equipment, or a material handling equipment location. The bounding box or the location may be manually identified, such as by a user. Alternatively, the bounding box or the location may be identified by an object detection algorithm, such as Yolo5.

In an example, the flow 1200 includes operation 1204, involving training, based at least in part on the second training data, the second machine learning model to generate bounding boxes. That is, the second machine learning model can be trained to receive images of objects transported on material handling equipment as input and can generate output that includes bounding boxes to indicate identified objects or particular locations on the material handling equipment.

In an example, the flow 1200 includes operation 1206, involving generating a second input that includes a first plurality of images to input into the second machine learning model. The first plurality of images can be received from the camera. The second input can be inputted into the second machine learning model after the second machine learning model is trained in operation 1204. In an example, the flow 1200 includes operation 1208, involving determining a second output of the second machine learning model based at least in part on the second input. The second output may indicate a bounding box position in an image of the first plurality of images. The bounding box may be positioned over an object on the material handling equipment.

In an example, the flow 1200 includes operation 1210, involving determining a change to the bounding box position based at least in part on the first plurality of images. For example, the device may identify a particular object in one image of the first plurality of images based on the bounding box. The device may track the particular object through successive images in the first plurality of images as the object is transported along the material handling equipment, based on a changing position of the associated bounding box.

In an example, the flow 1200 includes operation 1212, involving determining a jam occurrence based at least in part on the change to the bounding box position. For example, the device can determine that an object is jammed if its associated bounding box does not change position over time. In another example, the device can determine that two objects have collided based on a change and positioning of their respective bounding boxes. In an example, the flow 1200 includes operation 1214, involving including the first plurality of images and an indication of the jam occurrence in the first training data. The first training data can then be used to train the first machine learning model, to enable the machine learning model to predict jams based on changing positions of bounding boxes.

Figure 13:
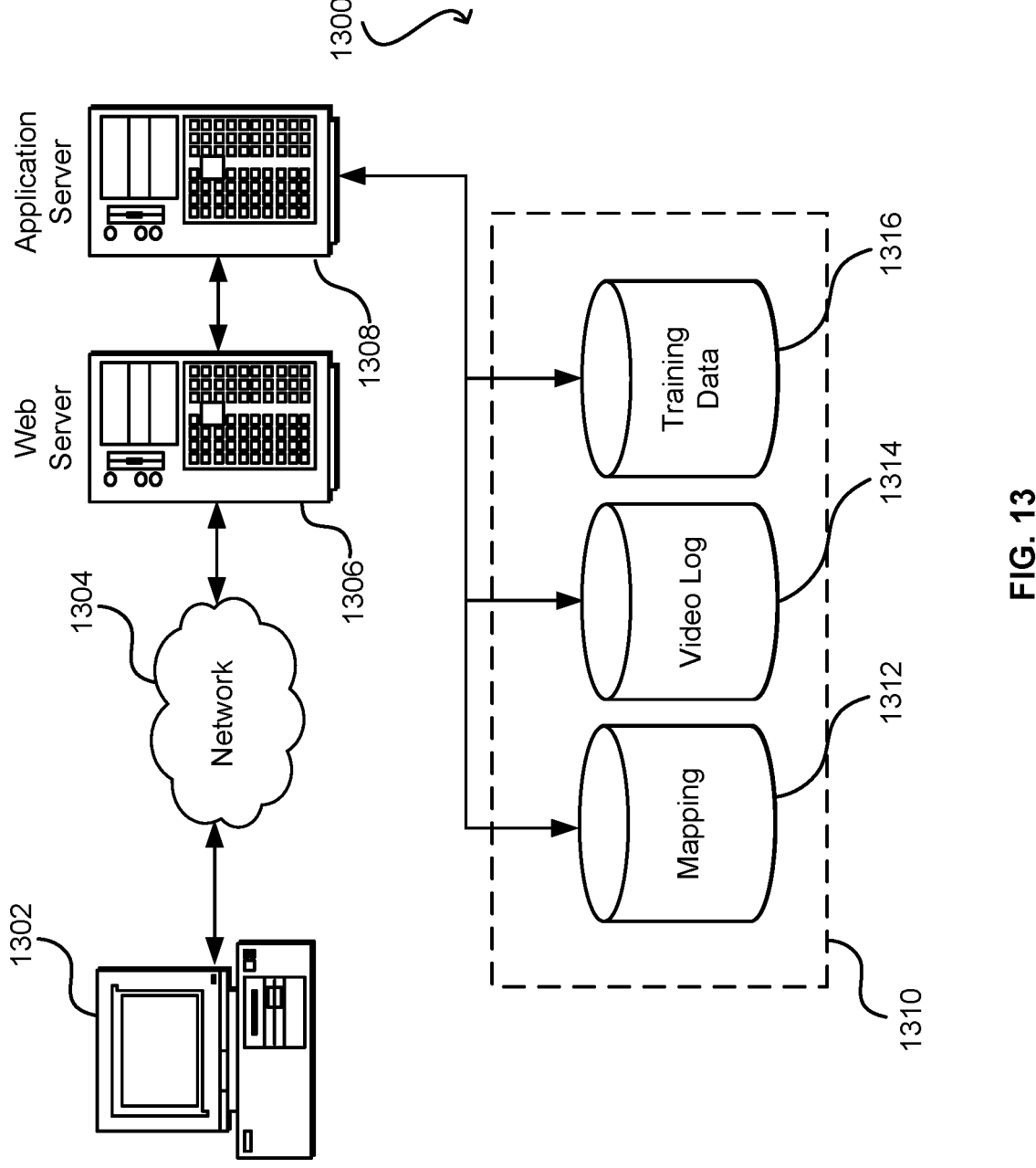
FIG. 13 illustrates an example environment for implementing aspects in accordance with various embodiments.

FIG. 13 illustrates an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device (including the devices described herein above) operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing information which can be used by modules described herein, such as jam classification mapping 1312, video logs 1314, and training data 1316. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A device comprising:
a camera configured to generate a video including images frames and showing at least portion of a material handling equipment;
one or more processors; and
one or more memory storing program code of a machine learning model and instructions that, upon execution by the one or more processors, configure the one or more processors to:
generate an input to the machine learning model, the input including a first image frame and a second image frame of the video, wherein the machine learning model is trained using training data that comprises an image and indicates, in the image, a bounding box around a first object that is being handled;
determine an output of the machine learning model based at least in part on the input, the output including a prediction that a jam in the material handling equipment is to occur within a next time interval and a classification of the jam, the jam involving a second object being handled by the material handling equipment and shown in the first image frame and the second image frame;
determine a jam prevention action to perform based at least in part on the classification; and
cause the jam prevention action to be performed within the next time interval in association with the second object such that the jam is prevented.

2. The device of claim 1, further comprising:
an input/output (I/O) interface configured to communicatively couple the device with a controller of the material handling equipment, wherein the one or more memory store additional instructions that, upon execution by the one or more processors, configure the one or more processors to:
determine a predicted location of the jam from the output of the machine learning model; and
send, to the controller via the I/O interface, a command indicating the jam prevention action and the predicted location, wherein the jam prevention action is executed by the controller and includes controlling the material handling equipment.

3. The device of claim 1, further comprising:
a controller, wherein the one or more memory store additional instructions that, upon execution by the one or more processors, configure the one or more processors to:

determine a predicted location of the jam from the output of the machine learning model; and
send, to the controller, a command indicating the jam prevention action and the predicted location, wherein the jam prevention action is controlled by the controller and includes handling the second object.

4. The device of claim 3, further comprising:
a jam prevention mechanism coupled with the controller and configured to handle the second object, wherein the jam prevention mechanism includes at least one of: a dynamo, a set of arms, a set of blowers, a set of actuators, a set of stoppers, a set of air blades, or a set of vibration drums.

5. A computer-implemented method comprising:
generating an input to a machine learning model, the input including a first image and a second image showing at least a portion of a material handling equipment, wherein the machine learning model is trained using training data that comprises another image and indicates, in the other image, a bounding box around an object that is being handled;
determining an output of the machine learning model based at least in part on the input, the output including a prediction that a jam in the material handling equipment is to occur;
determining, based at least in part on the prediction, that a jam prevention action is to be performed; and
causing the jam prevention action to be performed such that the jam is prevented.

6. The computer-implemented method of claim 5, further comprising:
determining a classification of the jam, wherein the classification is indicated in the output of the machine learning model; and
determining the jam prevention action based at least in part on the classification.

7. The computer-implemented method of claim 6, further comprising:
determining a predicted location of the jam in the material handling equipment, wherein the predicted location is indicated in the output of the machine learning model, and wherein the jam prevention action is performed at least at the predicted location.

8. The computer-implemented method of claim 5, further comprising:
determining the jam prevention action based at least in part on the output of the machine learning model, wherein the output indicates the jam prevention action to perform.

9. The computer-implemented method of claim 5, further comprising:
generating a second input to a second machine learning model, the second input including a third image showing at least a predicted location of the jam in the material handling equipment; and
determining a second output of the second machine learning model based at least in part on the second input, wherein the second output indicates whether the jam has occurred or not.

10. The computer-implemented method of claim 9, further comprising:
determining, based at least in part on the second output, that the jam has occurred; and
sending, to a user device, an alert indicating that the jam has occurred and at least one of the predicted location, an actual location of the jam in the material handling equipment, or the third image.

11. The computer-implemented method of claim 9, further comprising:

determining, based at least in part on the second output, that the jam has occurred;

determining a jam resolution action to perform; and causing the jam resolution action to be performed such that the jam is resolved.

12. The computer-implemented method of claim 9, further comprising:

generating additional training data based at least in part on the second output, wherein the additional training data includes the third image and an indication of whether the jam has occurred or not; and further training the machine learning model based at least in part on the additional training data.

13. One or more computer-readable storage media storing instructions that, upon execution by one or more processors, cause the one or more processors to perform operations comprising:

generating an input to a machine learning model, the input including a first image and a second image showing at least a portion of a material handling equipment, wherein the machine learning model is trained using training data that comprises another image and indicates, in the other image, a bounding box around an object that is being handled;

determining an output of the machine learning model based at least in part on the input, the output including a prediction that a jam in the material handling equipment is to occur;

determining, based at least in part on the prediction, that a jam prevention action is to be performed; and causing the jam prevention action to be performed such that the jam is prevented.

14. The one or more computer-readable storage media of claim 13 storing further instructions that, upon execution by one or more processors, cause the one or more processors to perform further operations comprising:

receiving a first plurality of images generated at a first rate;

selecting, from the first plurality of images, the first image and the second image to generate a first set of images at a second rate smaller than the first rate;

receiving a second plurality of images generated at the first rate;

selecting, from the second plurality of images, a third image to generate a second set of images at a third rate, wherein the third rate is based at least in part on the prediction and is larger than the second rate; and generating a second input to the machine learning model based at least in part on the second set of images.

15. The one or more computer-readable storage media of claim 13, wherein the training data is second training data comprising a second plurality of images, and wherein the one or more computer-readable storage media stores further instructions that, upon execution by one or more processors, cause the one or more processors to perform further operations comprising:

generating, by using a second machine learning model, first training data to train the machine learning model, wherein the first training data includes a first plurality of images and one or more labels indicating jam occurrence; and training the machine learning model based at least in part on the first training data.

16. The one or more computer-readable storage media of claim 15 storing additional instructions that, upon execution by one or more processors, cause the one or more processors to perform additional operations comprising:

generating the second training data that includes a second plurality of images and indicates, in the other image of the second plurality of images, at least one of: the bounding box around the object that is being handled or a material handling equipment location; and training, based at least in part on the second training data, the second machine learning model to generate bounding boxes.

17. The one or more computer-readable storage media of claim 16 storing other instructions that, upon execution by one or more processors, cause the one or more processors to perform other operations comprising:

generating a second input that includes the first plurality of images;

inputting, after the second machine learning model is trained, the second input to the second machine learning model;

determining a second output of the second machine learning model based at least in part on the second input, the second output indicating a bounding box position in a particular image of the first plurality of images;

determining a change to the bounding box position based at least in part on the first plurality of images;

determining the jam occurrence based at least in part on the change; and including the first plurality of images and an indication of the jam occurrence in the first training data.

18. The one or more computer-readable storage media of claim 13 storing further instructions that, upon execution by one or more processors, cause the one or more processors to perform further operations comprising:

receiving a first plurality of images generated at a first rate;

selecting, from the first plurality of images, the first image and the second image to generate a set of images at a second rate smaller than the first rate, wherein the input includes the set of images;

sending, to a remote computer system that hosts the machine learning model, the input; and receiving, from the remote computer system, the output of the machine learning model.

19. The one or more computer-readable storage media of claim 18 storing additional instructions that, upon execution by one or more processors, cause the one or more processors to perform additional operations comprising:

receiving, from the remote computer system, data indicating that the jam prevention action is to be performed; and controlling performance of the jam prevention action.

20. The one or more computer-readable storage media of claim 13 storing further instructions that, upon execution by one or more processors, cause the one or more processors to perform further operations comprising:

sending, to a remote computer system, data indicating that the jam prevention action is to be performed, wherein the remote computer system triggers performance of the jam prevention action.

\* \* \* \* \*